United States Patent [19]
Long

[11] 3,731,830
[45] May 8, 1973

[54] BIKE RACK FOR CAMPER AND THE LIKE

[76] Inventor: Robert J. Long, 14320 Clayton Road, San Jose, Calif.

[22] Filed: June 17, 1971

[21] Appl. No.: 154,045

[52] U.S. Cl................................214/450, 224/42.08
[51] Int. Cl................................................B60r 9/00
[58] Field of Search..........................214/450, 83.24; 224/42.3 B, 42.8, 42.21, 453, 454, 451

[56] References Cited

UNITED STATES PATENTS 3,586,188  6/1971  Cambell.............................214/450
3,330,431  7/1967  Knecht.............................224/42.21

Primary Examiner—Gerald M. Forlenza
Assistant Examiner—John Mannix
Attorney—Leslie M. Hansen

[57] ABSTRACT

A rack for receiving and supporting a motorbike and the like on the body of a road vehicle in a manner for shiftability and angular swing relative thereto for enabling ingress and/or egress to and from the body of the vehicle without complete removal of the motor bike from the rack entailing a carrier longitudinally movable and balanceable relative to a hinged roller support, spaced from bridging means on the vehicle and including suitable locking means convertible to a ramp for use during unloading and loading of the motor bike relative to the rack.

10 Claims, 11 Drawing Figures

Patented May 8, 1973
3,731,830
3 Sheets-Sheet 1
FIG. 1
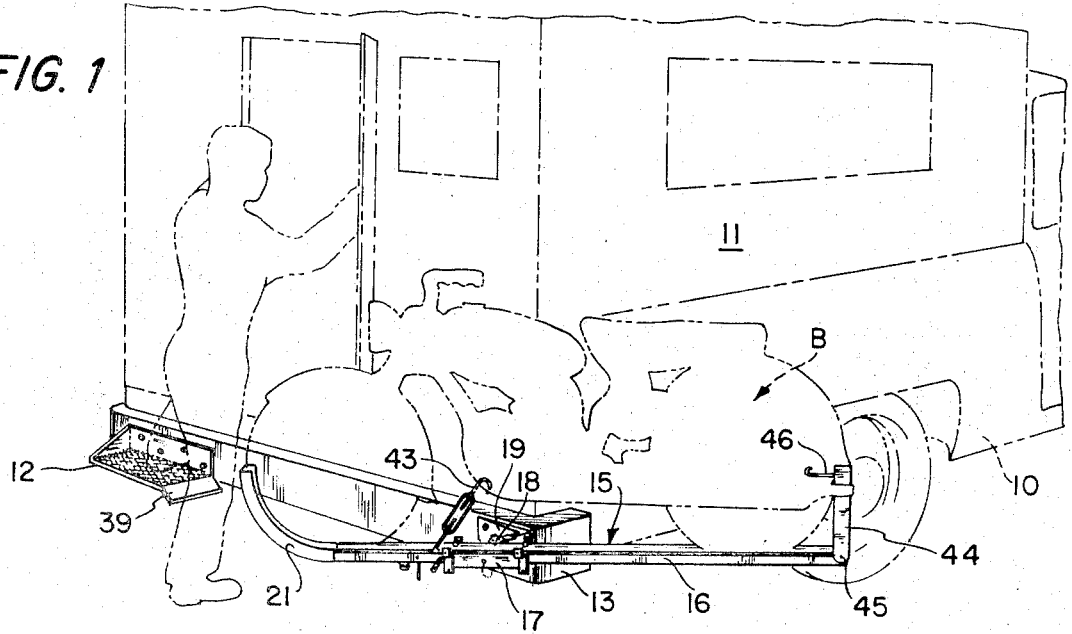
FIG. 2
FIG. 2A
FIG. 3
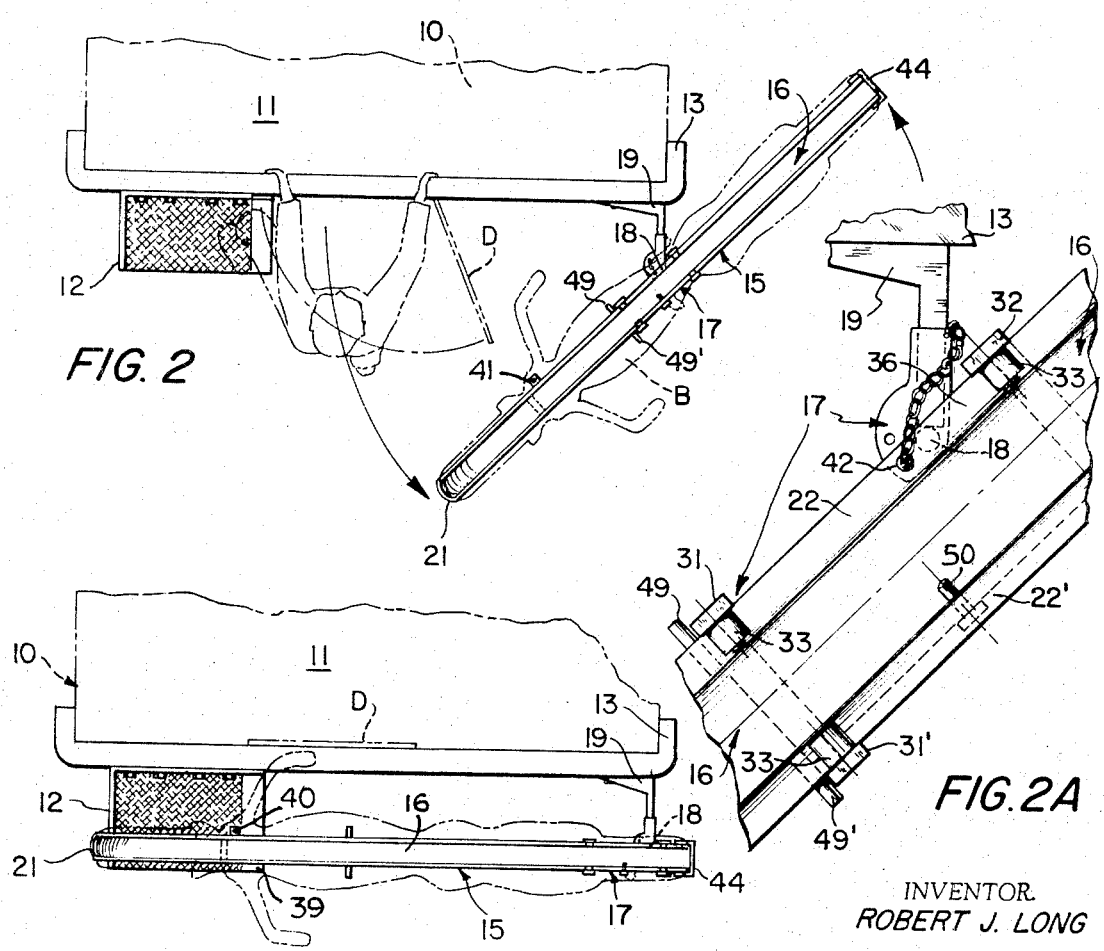
INVENTOR.
ROBERT J. LONG
BY
Leslie M. Hansen
HIS ATTORNEY Patented May 8, 1973 3,731,830

INVENTOR.
ROBERT J. LONG
BY
Leslie M. Hansen
HIS ATTORNEY

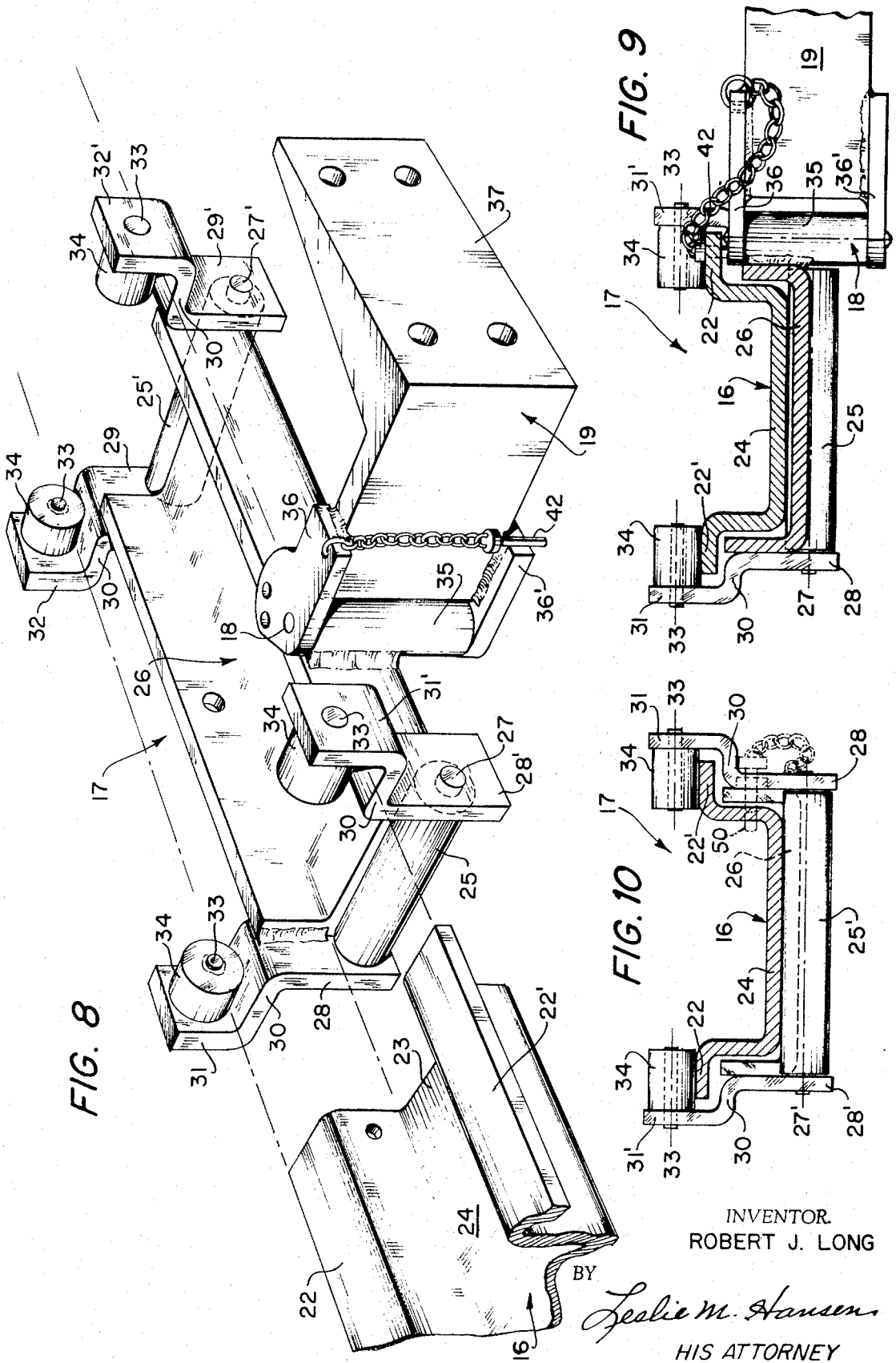

BIKE RACK FOR CAMPER AND THE LIKE

BACKGROUND

This invention relates to a carrier rack applied to a vehicle for receiving and supporting a motorbike and the like.

Many forms of racks have been devised as will be evidenced from an examination of the art of U. S. Class 214 sub cl. 450. In such devices it is the general idea to provide a means mounted on a road type vehicle for supporting and carrying a light weight motorcycle and the like.

Such prior known carriers usually include a channel member for supporting a two wheeled cycle in a relatively fixed condition on the back end of a conventional automotive main vehicle. Each case entails the problem of loading and unloading the motor bike relative to the carrier and the securing of the motorbike onto such carriers. Such carriers are usually mounted on the rear bumper of the main vehicle which may be a passenger vehicle, a station wagon, a trailer, a pick-up truck having a tailgate or an open body for a detachable camper and the like. In all cases if it is desired to gain access to the main vehicle either through the rear trunk; the tailgate or the rear door of a trailer or camper body, the motorbike usually has to be removed from such prior known carriers. The present invention seeks to overcome such tedious problems by providing a carrier constructed to facilitate access to or ingress and/or egress from the after end of the main vehicle without removing the motorbike from its carrier.

STATEMENT OF THE INVENTION

It is an object of the present invention to provide means for mounting a motorbike carrier on the after end of a main vehicle in such a manner as to facilitate ingress and egress to the latter without removing the motorbike from its carrier. This object contemplates the provision of a mounting means for the carrier by which the latter is shiftable relative to the vehicle. It also contemplates a mounting means which facilitates swinging the carrier relative to the main vehicle to attain such access to the after end of the latter.

More particularly it is an object to provide a hinged roller bracket for guiding and balancing a channel shaped bike support for longitudinal movement as well as swinging movement relative to the after end of a main vehicle having the bike carrier mounted thereon.

These and other objects and advantages of the present invention will become apparent from a reading of the following description and claims in the light of the accompanying three sheets of drawing in which:

FIG. 1 is a perspective view of a camper body and pickup having the cycle carrier of the present invention applied thereto and in aside position;

FIG. 2 is a fragmentary plan view of the pickup showing the carrier as in FIG. 1;

FIG. 2A is a fragmentary enlargement of a portion of FIG. 2;

FIG. 3 is a view similar to that of FIG. 2 with the carrier in traveling position;

FIG. 8 is an exploded perspective view of the hinge bracket and mount for the carrier of FIGS. 1 through 5;

FIG. 9 is a cross section through the carrier and carrier mount and hinge bracket as seen from line 9—9 in FIG. 7;

FIG. 10 is a cross section through the carrier and carrier mount as seen from line 10—10 in FIG. 7.

GENERAL DESCRIPTION

Figure 4:
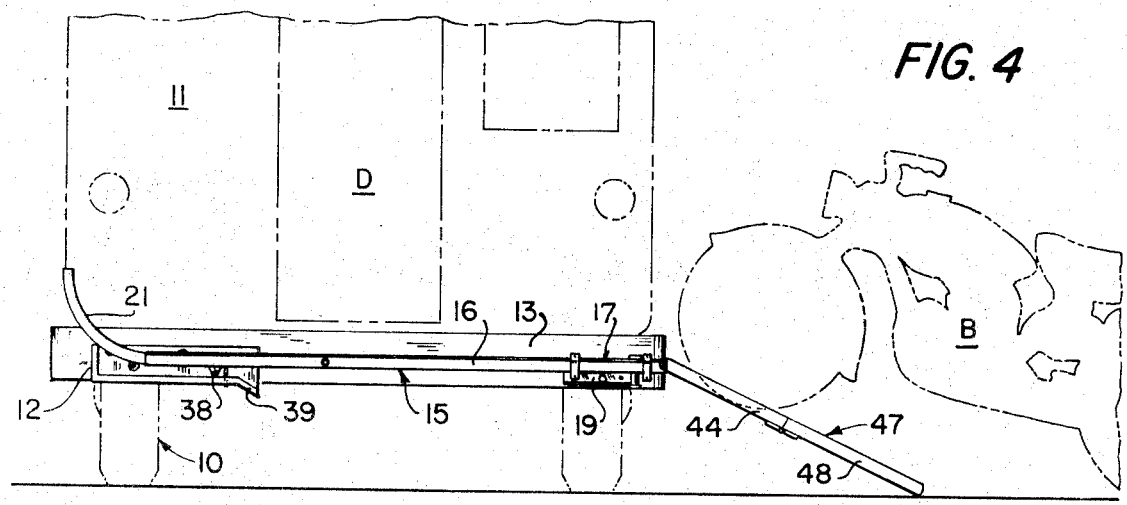
FIG. 4 is a rear elevational view of FIG. 3 with the carrier in loading and/or unloading position on the pickup.

Referring to the drawings a main vehicle 10 is shown as a pickup truck having a camper 11 secured to its bed. The particular camper 11 shown has a door opening D on its aft wall providing ingress and egress to the interior of the camper 11. A rearward projection in the form of a step 12 is provided on the rear bumper 13 of the camper 11 to enable a person to step up into the body of the camper via the door D.

The present invention has its embodiment in a carrier 15 by which to secure a motor bike B and the like to the rear wall of the main vehicle 10 in a manner to permit ingress and egress to the interior of the camper with a minimum of difficulty. The carrier 15 includes a channel shaped track 16 of a size to receive the tires of a two wheeled motorcycle for securing of the latter thereto in the usual manner. The invention resides in providing a roller support 17 hingedly mounted as at 18 on a bracket 19 secured to the rear bumper 13 or some firm portion of the chassis of the main vehicle 10.

In general the roller support 17 is related to the channel track 16 such that the latter can be rolled thereon to a balanced position with motorbike thereon. The entire assembly may then be swung away from the aft wall of the main vehicle sufficiently to clear outward swing of the door D and allow passengers to enter and leave the camper 11. The disposition of the carrier 15 on the back bumper 13 of the vehicle and its relation to the rearwardly projecting step 12 thereon forms a part of the structural and functional aspects of the present invention.

DETAILED DESCRIPTION

Referring to FIGS. 1 and 4 it will be noted that the channel shaped track 16 has a fore end 21 struck on a radius to receive and embrace at least a quadrant of a wheel of the motorbike B and extends rearwardly therefrom to receive and support the other wheel of the bike B. The channel shaped track 16 is also provided with lateral extensions 22–22' on each of its flanges (FIG. 8, 9 and 10) between the upturned fore end 21 and the opposite end 23 of the track.

Figure 7:
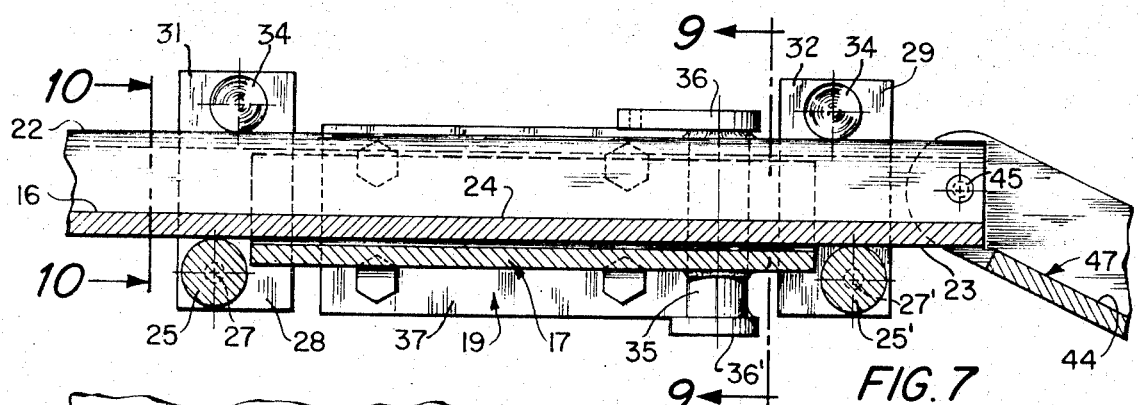
FIG. 7 is a fragmentary section through FIG. 5 taken along line 7—7 therein.

The base or web 24 of the channel shaped track 16 is disposed to ride on rollers 25–25' provided on the roller support 17 (FIGS. 7, 8 and 10) at each end of a U shaped body 26 of the latter of a size to receive the track 16. These rollers 25–25' are each journalled on a shaft 27–27', respectively, extending between depending brackets 28–28' and 29–29' welded to the respective ends of the channel shaped body 26. The brackets 28–28' and 29–29' each have their upper ends 30 offset laterally at the level of the upper ends of the flanges of the U shaped body 26 of the roller support 17. This provides clearance for the lateral extensions 22–22' on the straight section of the flanges of the channel shaped track 16, as they move longitudinally through the roller support 17.

The upper ends 30 of each of the brackets 28–28' and 29–29' are further provided with vertically extending uprights 31–31' and 32–32' outside the width of the lateral extensions 22–22' of the channel shaped track 16. Each of the uprights 31–31' and 32–32' has a spindle shaft 33 extending inwardly therefrom and rotatably supporting a roller 34 having tangent engagement with the upper surface of the lateral extensions 22–22' on each side of the channel shaped track 16.

By this arrangement the channel shaped track 16 is horizontally mounted for longitudinal movement relative to the roller support 17.

As best seen in FIGS. 8 and 9 the U shaped body 26 of the roller support 17 has a hinge barrel 35 welded to one flange thereof. The hinge barrel 35 is vertically disposed to fit between upper and lower hinge wings 36–36' of the bracket 19 for receipt of a hinge pin 18. The bracket 19 is L shaped and has its shortest foot extending back to a mounting leg portion 37 secured to the rear bumper 13 of the main vehicle 10.

Figure 5:
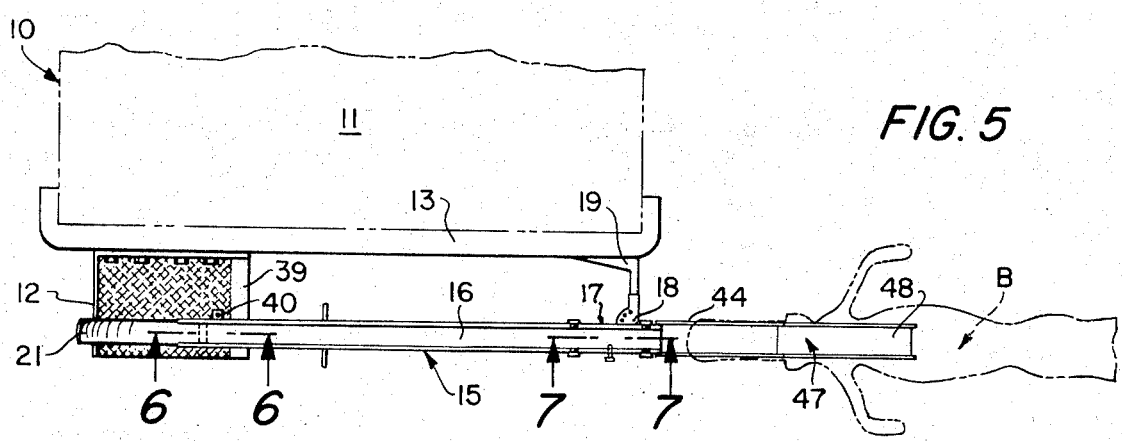
FIG. 5 is a plan view of FIG. 4.
Figure 6:
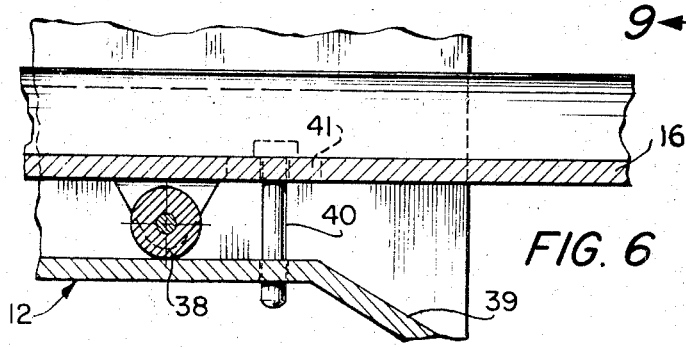
FIG. 6 is a fragmentary section through FIG. 5 taken along line 6—6 therein.

The bracket 19 is mounted adjacent one end of the bumper 13 (righthand end) as shown in FIGS. 2, 3 and 5. By this arrangement the channel shaped track 16, with a bike B thereon, balanced centrally of the roller support 17 can be swung into a diagonal position (FIGS. 2 and 2A) to provide clearance for the outward swing of the door D on the camper 11. When the door D is closed the roller support 17 and track 16 can be swung into parallel relation with the back wall of the camper. When parallel to the camper wall, the track 16 can be shifted longitudinally of the roller support 17 until the upturned fore end 21 of the track 16 overlies and becomes supported on the step 12, (FIGS. 3, 4 and 5). It should here be noted that the channel track 16 has a roller 38 mounted on its underside (FIGS. 4 and 6) to rest upon the step 12. It should also be noted that the step 12 is provided with a slight ramp 39 to receive and guide the roller 38 up an incline to the level of the step 12.

Once the channel track 16 is thus supported in bridging relation between the step 12 and the roller support 17 a pin 40 is inserted through an ear 41 on the track 16 overlying the step 12 and extending through the latter to lock the track in bridging relation to the step and roller support. As a further precaution the hingedly mounted roller support 17 also has a pin lock 42 (FIG. 2A) by which to secure the support roller 17 in either of its two positions, i.e., parallel and/or diagonal relative to the main vehicle 10.

As in most conventional bike racks or carriers the bike B is adapted to be secured to the channel shaped track 16. In accordance with the present invention this may be accomplished by a turnbuckled hook 43 (FIG. 1) as well as a back latch 44 pivotally connected to the after or open end of the track 16 as at 45. This back latch 44 is adapted to swing up into a verticle position to engage the back wheel of the motor bike B and to be secured to that wheel or its fender by a hook 46 as best seen in FIG. 1.

The back latch 44 of the present invention has a further function of providing the lead section (FIG. 7) of a ramp 47 by attachment of an extension 48 thereof thereto by a suitable coupling (FIGS. 4 and 5). Thus when the motor bike B is released from the channel track 16 the bike can be rolled off of the latter. Vice verse loading of the bike B onto the track 16 is easily accomplished via the ramp thus eliminating a lifting of the bike.

After loading of the bike B onto the channel shaped track 16 and the securing of the bike thereto, it is ready for travel as illustrated in FIG. 3. However, if access to the door D in the back wall of the camper becomes necessary the bike need not be removed from the carrier 15. All that need be done is to remove the locking pins 40 and 42. This releases the channel track 16 for longitudinal shifting toward the roller support 17. Suitable stop pegs 49–49' (FIGS. 2 and 2A) projecting from the flanges of the track 16 are disposed to engage the U shaped body 26 of the roller support 17 at a position in which the track 16 with bike thereon will be balanced upon the hingedly mounted roller support 17. When so balanced, the channel 16 is secured to the U shaped body 26 against relative movement. This is accomplished by a cross pin 50 (FIGS. 2A and 10) between adjacent flanges of the channel 16 and body 26. The latter can now be swung out to a diagonal position and locked therein by pin lock 42 to enable persons ingress and egress relative to the camper.

Having thus described the Bike Rack for Camper in specific detail it will be appreciated by those skilled in the art that the same may be modified, altered and/or varied without departing from the spirit or scope of the invention therein as set forth in the appended claims.

What I claim as new and desire to protect by Letters Patent is:

1. A rack for carrying a motor bike and the like on the after end of a road vehicle having a door opening therein and means facilitating ingress and/or egress to the interior of such vehicle without removal of the bike from the rack comprising in combination:
   1. a channel shaped track;
   2. a rearward projection on the after end of said vehicle adapted to support one end of said channel shaped track thereon;
   3. means for securing a motor bike to said channel shaped track;
   4. a roller support for supporting said channel shaped track for longitudinal movement relative thereto;
   5. bracket means for said roller support secured to the after end of such vehicle in offset relation to said rearward projection and the door opening of said vehicle for normally supporting the opposite end of said channel shaped track and facilitating longitudinal movement of said channel shaped track to a position of support substantially midway its ends on said roller support; and
   6. means for pivotally mounting said roller support on said bracket means for swinging movement to dispose said track angularly relative to the after end of the vehicle and clear of the door opening therein.

2. The bike rack in accordance with that of claim 1 in which said rearward projection therein comprises a step secured to the after end of said vehicle adjacent that side thereof opposite to said bracket means and substantially in the same horizontal plane of said roller support for supporting one end of said channel shaped track when it is parallel to the after end of the vehicle and extended toward said step from said roller support.

3. The bike rack in accordance with that of claim 2 in which said roller support comprises:

1. a U shaped body for receiving said channel shaped track; and
2. rollers journaled transversely of the ends of said U shaped body for rollingly supporting said channel shaped track relative thereto.

4. The bike rack in accordance with that of claim 3 including a roller mounted on the underside of said one end of said channel shaped track for rollingly engaging said step.

5. The bike rack in accordance with that of claim 4 including:
  1. lateral extensions on each of the side flanges of said channel shaped track disposed to overlie the flanges of the U shaped body of said roller support;
  2. offset brackets on opposite sides of each end of said U shaped body;
  3. upstanding ends on each of said brackets adjacent the outer edges of such lateral extensions; and
  4. a roller on each upstanding end of said brackets overlying the later extensions on said channel shaped track for maintaining the latter horizontally disposed on said roller support for longitudinal movement relative thereto.

6. The bike rack in accordance with that of claim 5 including stop means projecting laterally from the side flanges of said channel shaped track for engaging one end of said U shaped body when said track, with bike thereon, is disposed in balanced relation upon said roller support.

7. The bike rack in accordance with that of claim 6 including releasable locking means between said U shaped body and said channel shaped track for locking the latter in balanced relation relative to said roller support.

8. The bike rack in accordance with that of claim 7 including means between said U shaped body and said bracket means for releasably securing said roller support alternatively in angular and parallel relation relative to the after end of the vehicle.

9. The bike rack in accordance with that of claim 8 including means between said one end of said channel shaped track and said step for releasably securing them together when said one end of said channel shaped track overlies and is supported on said step.

10. The bike rack in accordance with that of claim 9 in which the means for securing a motor bike to said channel shaped track includes a back latch on said end of said channel shaped track opposite said one end thereof; said back latch comprising:
  1. a lead section for a loading and unloading ramp for a motor bike;
  2. means pivotally connecting said lead section to said opposite end of the channel shaped track for verticle positioning against an adjacent wheel of the motor bike thereon; and
  3. means for securing the free end of said lead section to the wheel of a motor bike engaged thereby.

* * * * *